July 18, 1950 L. M. SMOOT 2,515,429
SCOOP
Filed Oct. 18, 1945 3 Sheets-Sheet 1
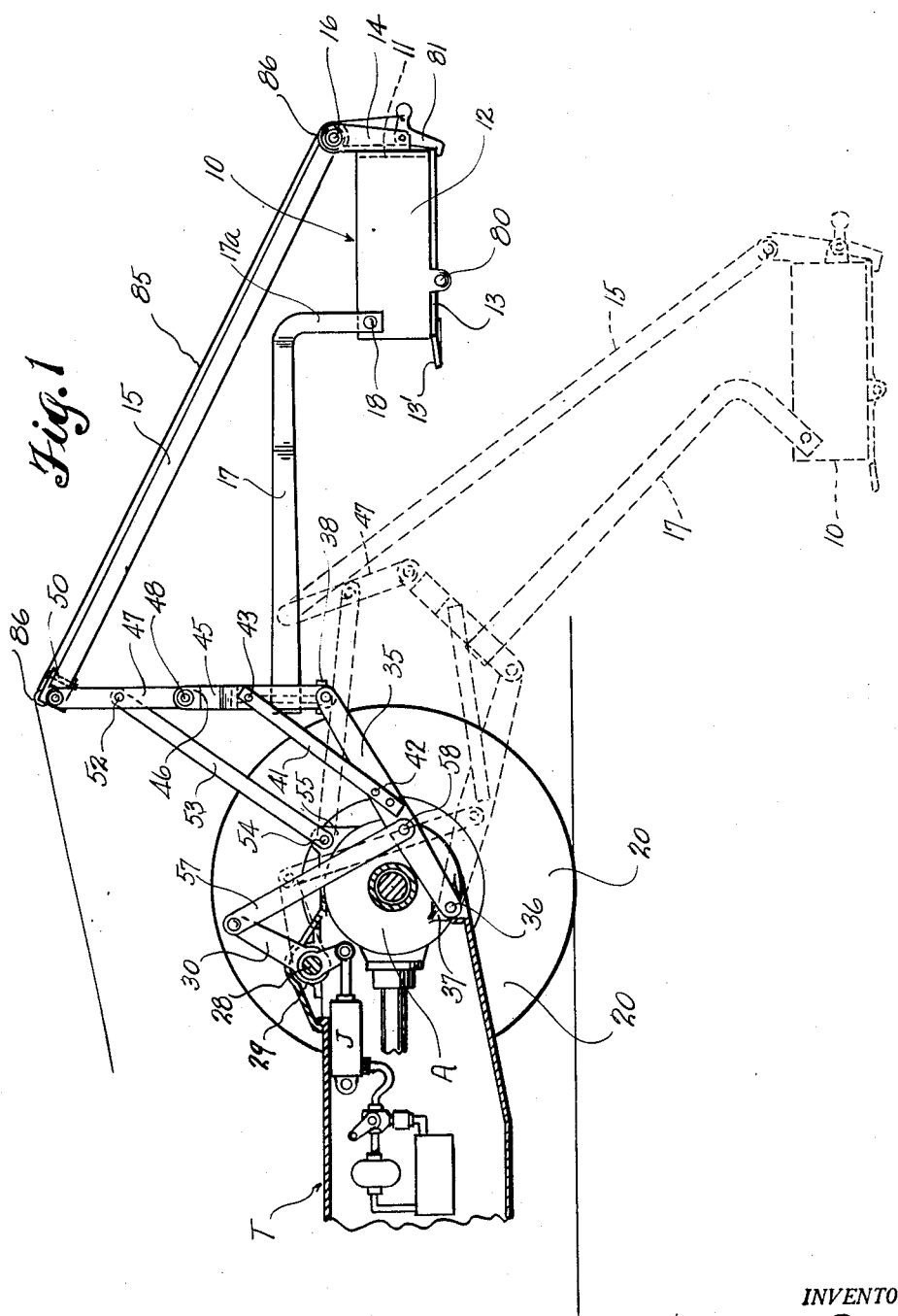
INVENTOR.
LLOYD M. SMOOT
BY
Cook & Robinson
ATTORNEYS

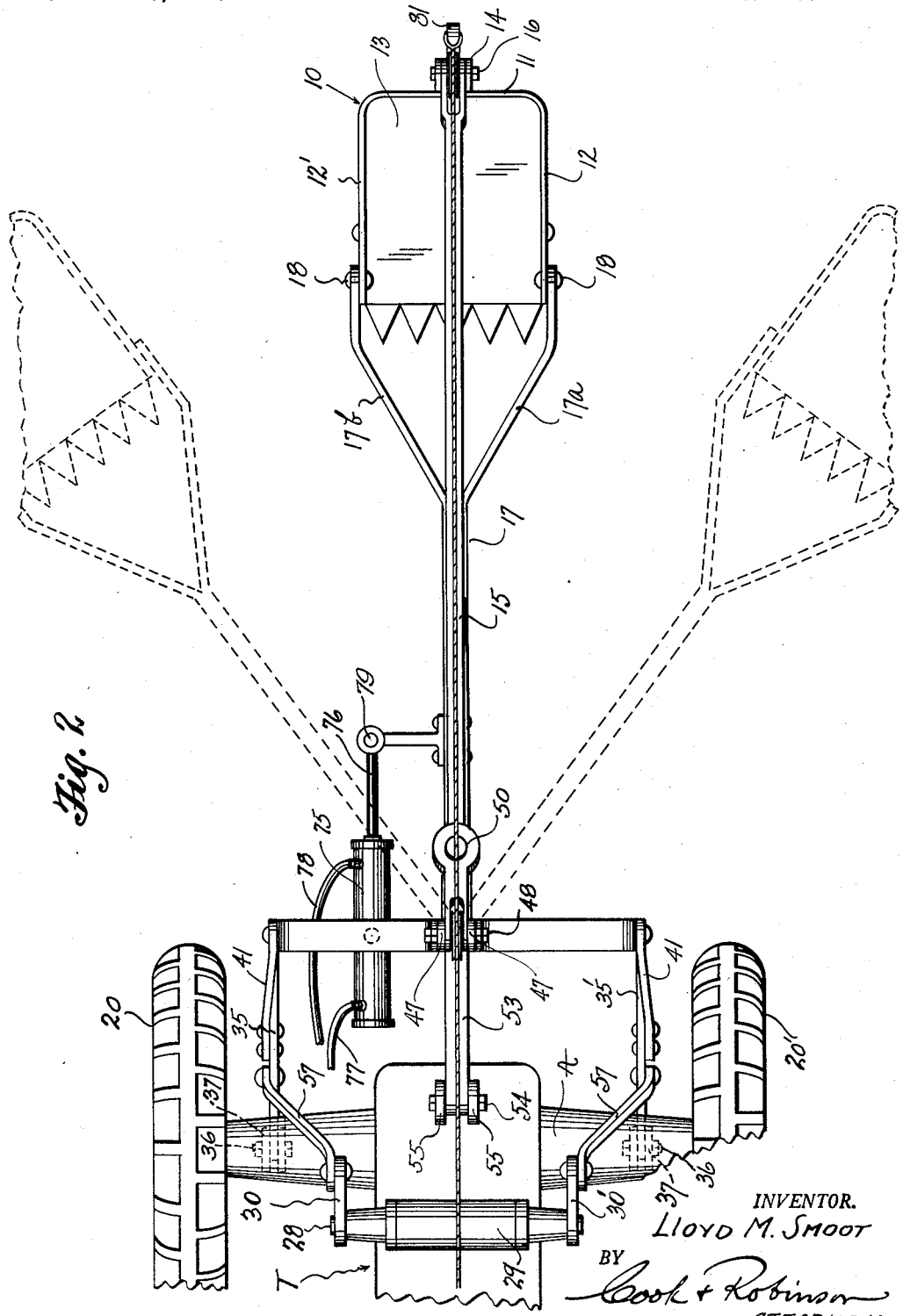

July 18, 1950   L. M. SMOOT   2,515,429
SCOOP
Filed Oct. 18, 1945   3 Sheets-Sheet 3
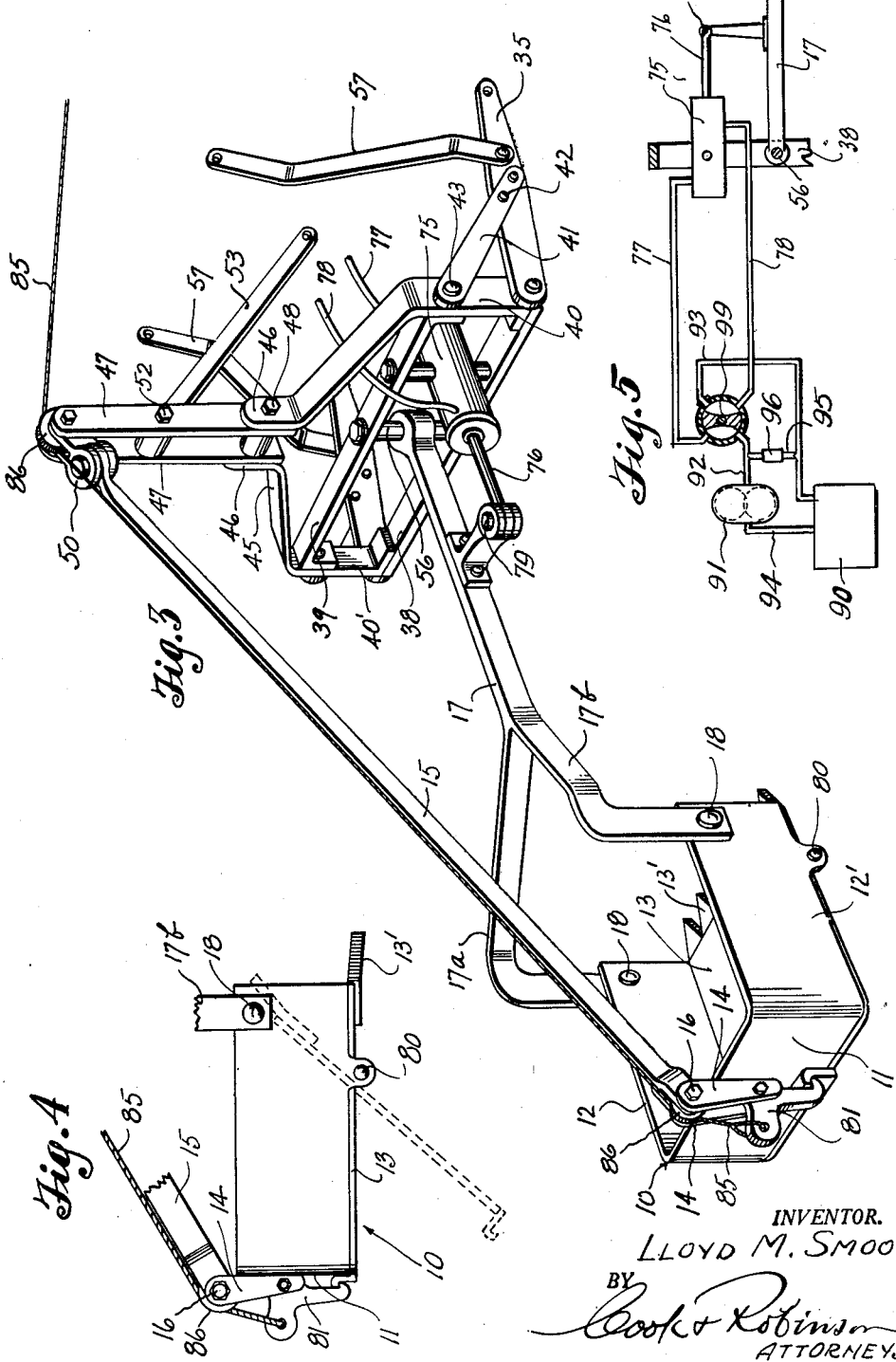
INVENTOR.
LLOYD M. SMOOT
BY
Cook & Robinson
ATTORNEYS Patented July 18, 1950

2,515,429

UNITED STATES PATENT OFFICE 2,515,429

SCOOP

Lloyd M. Smoot, Everett, Wash., assignor of one-half to Leo S. Ross, Seattle, Wash.

Application October 18, 1945, Serial No. 622,994

2 Claims. (Cl. 37—126)

This invention relates to improvements in scrapers, and it has reference more particularly to scrapers designed for use as an attachment for tractors for use in grading, ditch digging, clearing and various other operations; such scrapers including connecting linkage through which the scraper scoop or bowl may be drawn by the tractor for loading and through which the scoop may then be lifted clear of the ground and carried by the tractor to a place for unloading or dumping.

Explanatory to the present invention, it will here be stated that there are scraper attachments for tractors now on the market, typified by that disclosed in U. S. Letters Patent to Arps, No. 2,364,121 of December 5, 1944, that may be attached to and operated from the rear of a small farm tractor, through connections by which the scoop may be loaded, lifted and dumped. However, to my knowledge, no such scraper of that type has been provided in connection with a tractor or other prime mover having connecting linkage with the tractor whereby the loaded scraper may be lifted and then selectively swung to one or the other side of the line of travel of the tractor and automatically unloaded.

There are several disadvantages in such structures as that of the patent above mentioned; in not being able to unload, or dump the scraper except at the rear of the tractor, and there are many advantages in being able to selectively unload or dump the loaded scoop at one side or the other. Therefore, it has been one of the principal objects of this invention to provide a scraper attachment designed to be drawn at the rear of a tractor as is the scraper of the patent above mentioned, but which is connected to the tractor through novel supporting and operating devices and linkage whereby the loaded scraper may be raised from loading position to an elevated position, then swung to either side of the line of travel under positive control, and the load discharged.

It is also an object of this invention to provide novel supporting and actuating linkage for the scoop or scraper whereby it will be held in a horizontal position during all raising, lowering and swinging movements.

Another object of the invention resides in the provision of a scraper scoop with pivoted bottom wall and means in connection therewith whereby a load carried in the scoop may be automatically unloaded upon release of its pivoted bottom wall, and whereby the bottom wall will be automatically returned to its closed position upon discharge of the load from the scoop.

Another object of the invention is to provide hydraulic power devices for controlling the lateral swinging actions of the scoop or bowl.

Still other objects of the invention are to be found in the details of construction of the various parts, in their combination, relationship and mode of operation as will hereinafter be fully described.

In accomplishing these and other objects of the invention, I have provided the improved details of construction, the preferred forms of which are illustrated in the accompanying drawings, wherein:

Fig. 1 is a side view of a scraper mechanism embodied by the present invention, as attached to a tractor, showing in full lines the loaded scoop or scraper bowl in raised position, and showing it in dotted lines in a lowered position as for loading or filling.

Fig. 2 is a plan, or top view of the scraper mechanism, and indicating in dotted lines, the lateral swinging of the scoop to either side of the line of travel of the tractor to which the mechanism is attached.

Fig. 3 is a perspective view of the scoop and its supporting and operating linkage, detached from the tractor.

Fig. 4 is a longitudinal section of the scoop, illustrating the pivotal action of its bottom wall.

Fig. 5 is a diagrammatic illustration of the hydraulic control system and devices for swinging the scoop supporting boom to either side of a neutral position, and for holding it in a set position.

Referring more in detail to the drawings:

The apparatus comprised by the present scraper mechanism, in its present preferred form, is designed to be used in connection with and as an attachment for farm tractors of that kind, or type, typified by the tractors shown in United States Letters Patents Nos. 2,118,180 and 2,118,181. Preferably, the tractor selected for use in the combination would be one equipped with a hydraulic power lift as standard equipment. However, other types of lifts might be employed. In each of the patents above mentioned, the tractor shown has a power lift of a satisfactory kind for the present apparatus. In connection with the hydraulic mechanism of the tractor, the lift mechanism includes a horizontal shaft supported across the top of the rear axle housing for rotative adjustment in opposite directions under manual control and at the ends of this cross shaft, which extend equally to opposite sides of the center line of the tractor, lever arms are fixed, and to these arms links are attached in anticipation of their being used for the raising or lowering of an agricultural implement that may be drawn by the tractor. The present equipment, now to be described, is designed for application to a tractor that has such an arrangement of hydraulic system and lever arms.

In its present preferred form of construction, the scraper mechanism comprises the scraper or scoop which is herein designated in its entirety by reference numeral 10. This scoop comprises a vertical rear end wall 11; opposite side walls 12 and 12', and a bottom wall 13. The scoop thus formed is open at its forward end for filling. Fixed to the rear end wall 11, centrally thereof are spaced, upstanding ears 14 between which the rear end of a supporting link 15 is attached by a horizontal hinge pin 16. At its forward end, the scoop is attached to the rear end of a supporting boom 17 which, as noted best in Fig. 3, has diverging legs 17a—17b with downturned ends extended to opposite sides of the scoop and fixed pivotally to the side walls 12 and 12' by means of pivot bolts 18.

The tractor with which the scraper is to be used is shown in part in Figs. 1 and 2, where it is designated by reference character T, and it is shown as having a frame structure supported at its rear end by a pair of spaced traction wheels 20 and 20'. An axle housing and transmission gear case, designated generally by reference character A extends between the wheels and encloses therein the usual differential gearing, not shown.

Within the main frame structure or housing, forwardly of the case A, the previously mentioned hydraulic lift mechanism is enclosed in suitable manner. The lift mechanism, as seen in Fig. 1, includes a cross shaft 28 rotatably supported across the top of gear case A in a bearing 29. The shaft has an operating connection with the piston of a hydraulic jack J. Fixed to the ends of this cross shaft are the parallel lever arms 30 and 30' through which lifting of an implement drawn by the tractor may be accomplished. It is provided that under control of the hydraulic jack mechanism incorporated in the tractor, the shaft 28 may be rotatably adjusted in opposite directions under manual control to swing the lever arms 30 and 30' between one extreme position, at which they extend substantially horizontally and rearwardly directed, and an opposite extreme at which they extend upwardly, or substantially vertical.

Extended rearwardly from the axle housing A is a pair of vertically swinging lever arms 35 and 35'. These arms have their forward ends pivotally fixed by hinge bolts 36 to lugs 37 on the case A; the lugs being horizontally alined and symmetrically spaced relative to the center line of the tractor and set somewhat outside the planes in which the lever arms 30 and 30' swing.

At their rear ends, the lever arms 35 and 35' are rigidly fixed to the opposite ends of a rectangular frame structure which, for purpose of easier identification, I will call the "attachment frame." This attachment frame comprises a horizontal bottom bar 38, a horizontal top bar 39 and opposite end bars 40 and 40'. The lever arms 35 and 35' have fixed connection at their rear ends with the ends of the attachment frame and the relationship of the frame to the supporting arms is such that when the arms 35—35' are in the upwardly inclined position, which is the "raised position" as seen in full lines in Fig. 1, the frame will be substantially vertical, and it is held rigid relative to the arms by brace bars 41 that have ends securely attached to the arms, as at 42, and their other ends fixed to the end members 40 of the frame, as at 43.

Extending above the attachment frame structure above described, and rigidly fixed thereto, is an upstanding yoke or arch 45 which, at its top center is formed with spaced, upwardly directed ears 46—46, between which the lower end of paired, spaced, parallel bars 47—47 is hingedly attached by a horizontal bolt 48. The forward end of the scoop supporting link 15 is located between and has a universal connection as indicated at 50, with the upper ends of the paired bars 47—47. Pivotally fixed to the bars between their upper and lower ends, as at 52, is the rear end of a supporting link 53, the forward end of which is pivotally attached by a horizontal hinge bolt 54 between lugs 55—55 formed on the top side of case A at a location in the central line of the tractor.

The forward end of the boom 17 is mounted on a vertical pivot shaft 56 and this is pivotally mounted at upper and lower ends in the frame bars 38 and 39 in the same vertical plane of the forwardly and rearwardly swinging links 47. In this arrangement of attachment frame and linkage, the length of the lever arms 35—35' and the link 53, and the points of connection of these links with the tractor housing A is such that with the attachment frame lifted thereby to its "raised position" shown in full lines in Fig. 1, the attachment frame and the bars 47—47, hinged thereon, will be substantially vertical and the scoop will be supported by the boom 17 and link 15 above the ground level and in horizontal position. Furthermore, that with the swinging of the lever arms 35—35' downwardly, as to the dotted line position in Fig. 1, the bars 47 will hinge about the pivotal support 48 and swing to a forwardly inclined position while the attachment frame will be inclined rearwardly. This relative movement of the frame and bars 47—47 during raising and lowering of the attachment frame results in the scoop being held in a level position at any elevation.

The raising and lowering of the arms 35—35', for the upward and downward adjustment of the attachment frame above described, is effected by the up or down swinging of the arms 30 and 30' which are connected at their ends by links 57—57 with the corresponding lever arms 35—35' by pivot bolts 58.

The relationship of the pivot shaft 56, which mounts the boom 17 for lateral swinging movement and the universal joint 50 is such that when the attachment frame is raised, the boom may then swing to either side and in a horizontal plane, and while such swinging movement is most generally desired for dumping a load, it may be employed under some conditions to facilitate loading operations.

The means for holding the scraper boom 17 at a definite position relative to the line of travel, or to swing it toward either side, is provided by a hydraulic jack 75 that is pivotally mounted in the attachment frame at one side of the center, and this jack has its piston rod 76 pivotally connected to boom 17 rearwardly of the supporting pivot shaft 56 as at 79 in Fig. 3. Hydraulic pressure medium is admitted to and from the jack cylinder through flexible conduits 77 and 78 under control of a hand valve 99 located adjacent the driver's seat on the tractor, to cause the rod to be extended or retracted, thus to swing the boom. Pressure medium is preferably supplied from the same source as that for the hydraulic lift device which actuates shaft 28. In Fig. 5 the supply tank of liquid is designated at 90, and pressure pump at 91. The valve 99 is a four way valve with lines 77 and 78 leading to the jack and lines 92 and 93 to the pump and to the tank respectively. Pipe 94 connects the tank to the intake of the pump and a cross line 95 including a pressure relief valve 96 connects pipes 92 and 93. Pressure may be admitted to either end of the cylinder and exhausted from the other.

The scoop is designed for automatic unloading. Its bottom wall 13 is pivoted in the side walls at a line somewhat forward of the center, as at 80, and the forward edge of this plate is formed with digging teeth 13'. Mounted on the rear and wall of the scoop is a pivoted latch hook 81 designed to engage beneath the back edge of the hinged bottom 13 to hold it in closed position. The latch is weighted so that it will automatically swing toward holding position and a cable 85 extends therefrom along the link 15, over suitable guides 86 and to the driver's position. Pull on this cable will release the latch for discharge of the load. After the load has been discharged, the bottom swings back to closed position due to the added weight in the teeth or bar applied to the digging edge.

Such a scraper is efficient and effective for ditch digging or cleaning operations, besides being very useful for grading and load hauling. It may be made in various sizes and may employ the devices shown for its support, or other suitable means. Also, it is anticipated that such scrapers might be applied to bulldozers by slight modifications to parts.

Having thus described my invention, what I claim as new therein and desire to secure by Letters Patent is:

1. In combination with a tractor of the character described having a power lift mechanism; a transverse, vertical frame structure adapted to be raised and lowered by said power lift mechanism and comprising a rigid lower section and a rigid upper section joined by a horizontal transversely directed hinge pin, a pair of coextensive laterally spaced links pivotally connected at their forward ends to opposite sides of the tractor frame and having rigid connections at their rearward ends with the opposite ends of the lower section of the transverse frame, a link pivotally connected at its forward end to the tractor frame medially of and above the points of connection of the first mentioned links and pivotally connected at its rearward end to the upper portion of the upper section of the said transverse vertical frame, a load-carrying scoop disposed rearwardly of the tractor, two rigid, bowl suspending links with forward ends pivotally connected, respectively, in the upper and lower sections of the said frame structure in the central, longitudinal plane of the tractor, and adapted to swing at their rearward ends to opposite sides of the tractor, the lower link having a pivoted supporting connection at its rearward end with the forward end of the scoop, and said upper link having a pivoted, supporting connection with the scoop at its rearward end, said hinged sections of the frame structure being relatively movable in accordance with vertical adjustments of the frame structure by the power lift mechanism to maintain the scoop substantially in level position for all vertical adjustments of the said vertical frame, and a power operated means mounted in the lower section of the transverse frame and operatively connected with one of the said rigid scoop suspending links to control the lateral position of the scoop.

2. A combination as in claim 1 wherein the power mechanism includes a hydraulic cylinder pivotally mounted in the lower section of said vertical frame structure and having a piston rod extended therefrom and operatively connected with the lower scoop suspending link for effecting and retaining the lateral positioning of the scoop.

LLOYD M. SMOOT.

REFERENCES CITED

The following references are of record in the file of this patent:

UNITED STATES PATENTS

| Number | Name | Date |
| --- | --- | --- |
| 1,511,115 | Downie | Oct. 7, 1924 |
| 2,273,875 | Livesey et al. | Feb. 24, 1942 |
| 2,341,007 | Wommer | Feb. 8, 1944 |
| 2,352,466 | Arps | June 27, 1944 |